(12) United States Patent
Imamura et al.

(10) Patent No.: US 11,368,069 B2
(45) Date of Patent: Jun. 21, 2022

(54) ROTARY ELECTRIC MACHINE UNIT

(71) Applicant: HONDA MOTOR CO., LTD., Tokyo (JP)

(72) Inventors: Takehiro Imamura, Saitama (JP); Misa Aneha, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 228 days.

(21) Appl. No.: 16/800,738

(22) Filed: Feb. 25, 2020

(65) Prior Publication Data
US 2020/0274418 A1 Aug. 27, 2020

(30) Foreign Application Priority Data
Feb. 25, 2019 (JP) .............................. JP2019-031953

(51) Int. Cl.
*H02K 5/22* (2006.01)
*H02K 9/19* (2006.01)
(Continued)

(52) U.S. Cl.
CPC .............. *H02K 5/225* (2013.01); *H02K 3/52* (2013.01); *H02K 5/22* (2013.01); *H02K 9/19* (2013.01);
(Continued)

(58) Field of Classification Search
CPC .. H02K 3/50; H02K 3/52; H02K 9/19; H02K 5/225; H02K 16/00; H02K 5/22;
(Continued)

(56) References Cited

U.S. PATENT DOCUMENTS 4,712,029 A * 12/1987 Nold ...................... H02K 5/225
174/15.3
2012/0229005 A1 9/2012 Tominaga et al.
(Continued)

FOREIGN PATENT DOCUMENTS

CN 102763309 A 10/2012
CN 104541437 A 4/2015
(Continued)

OTHER PUBLICATIONS

Shioji et al, Terminal Connection Structure of Rotary Electric Machine, Jun. 11, 2015, JP 2015109742 (English Machine Translation) (Year: 2015).*
(Continued)

*Primary Examiner* — Quyen P Leung
*Assistant Examiner* — Alexander A Singh
(74) *Attorney, Agent, or Firm* — Paratus Law Group, PLLC (57) ABSTRACT

A rotary electric machine unit includes: a rotary electric machine; and a case that accommodates the rotary electric machine. The rotary electric machine includes: a stator core; a multi-phase coil that is attached to the stator core; a conductive member holder that collectively holds a conductive member connected to a coil end of the multi-phase coil and is disposed outside the coil end in a radial direction; and a terminal block that is fixed to a fastening surface of the case and electrically connects a terminal portion of a power distribution member with a terminal portion of the conductive member. The terminal block is disposed outside the conductive member holder in the radial direction, and at least a part of the terminal block overlaps the conductive member holder in the radial direction.

3 Claims, 7 Drawing Sheets

(51) Int. Cl.
*H02K 3/52* (2006.01)
*H02K 16/00* (2006.01)

(52) U.S. Cl.
CPC ......... *H02K 16/00* (2013.01); *H02K 2203/09* (2013.01)

(58) Field of Classification Search
CPC .. H02K 2203/09; H02K 2213/03; H02K 3/28; H02K 3/522; H02K 11/30; H02K 11/33; H02K 3/505
USPC .......................................................... 310/71
See application file for complete search history.

(56) References Cited

U.S. PATENT DOCUMENTS

| 2015/0188376 | A1 | 7/2015 | Yamaguchi et al. |
| 2016/0301276 | A1 | 10/2016 | Saki et al. |
| 2016/0380502 | A1 | 12/2016 | Koiwai et al. |
| 2017/0104281 | A1* | 4/2017 | Kurono ................ H01R 9/2416 |
| 2017/0110929 | A1* | 4/2017 | Egami .................... H02K 5/225 |
| 2020/0052540 | A1* | 2/2020 | Mashiko ................. H01B 7/40 |

FOREIGN PATENT DOCUMENTS

| CN | 106100193 A | | 11/2016 |
| EP | 0500954 A1 | | 9/1992 |
| JP | H04-117150 A | | 4/1992 |
| JP | 2008-125170 A | | 5/2008 |
| JP | 2009-284659 A | | 12/2009 |
| JP | 2015109742 A | * | 6/2015 |
| JP | 2017-017798 A | | 1/2017 |
| JP | 2017-130290 A | | 7/2017 |

OTHER PUBLICATIONS

Nov. 17, 2020, Japanese Office Action issued for related JP Application No. 2019-031953.
Dec. 17, 2021, Chinese Office Action issued for related CN Application No. 202010100638.8.

* cited by examiner

ROTARY ELECTRIC MACHINE UNIT

CROSS-REFERENCE TO RELATED APPLICATIONS

The present application claims the benefit of priority of Japanese Patent Application No. 2019-031953, filed on Feb. 25, 2019, the content of which is incorporated herein by reference.

TECHNICAL FIELD

The present invention relates to a rotary electric machine unit mounted on an electric vehicle or the like.

BACKGROUND ART

Conventionally, a rotary electric machine unit is mounted as a drive source in an electric vehicle or the like. For example, JP-A-2009-284659 discloses a motor unit. In the motor unit of JP-A-2009-284659, a motor terminal block is attached to a wall portion of a case, and a motor terminal extending from a motor winding and an inverter cable of an inverter are electrically connected to each other by the motor terminal block.

However, in the motor unit of JP-A-2009-284659, since the motor terminal block is disposed at a position overlapping with a stator in a radial direction of a motor, and the motor terminal is attached from a longitudinal direction (axial direction of the motor) of the motor terminal block, the motor terminal block and the motor terminal protrude in the axial direction of the motor, so that there is a problem that it is difficult to reduce size of the motor unit.

SUMMARY

The present invention provides a rotary electric machine unit that can be reduced in size by reducing a space occupied by a terminal block and a conductive member holder.

According to an aspect of the present invention, there is provided a rotary electric machine unit including: a rotary electric machine; and a case that accommodates the rotary electric machine, wherein: the rotary electric machine includes: a stator core; a multi-phase coil that is attached to the stator core; a conductive member holder that collectively holds a conductive member connected to a coil end of the multi-phase coil and is disposed outside the coil end in a radial direction; and a terminal block that is fixed to a fastening surface of the case and electrically connects a terminal portion of a power distribution member with a terminal portion of the conductive member; and the terminal block is disposed outside the conductive member holder in the radial direction, and at least a part of the terminal block overlaps the conductive member holder in the radial direction.

Effects

According to the present invention, since the conductive member holder is disposed outside the coil end in the radial direction, the conductive member holder can be prevented from protruding in the axial direction. Since the terminal block that electrically connects the terminal portion of the power distribution member with the terminal portion of the conductive member is disposed outside the conductive member holder in the radial direction, the terminal block can be prevented from protruding in the axial direction, so that a length of the rotary electric machine in the axial direction can be shortened. In addition, since at least a part of the terminal block overlaps the conductive member holder in the radial direction, a length of the rotary electric machine in the radial direction can also be shortened. Therefore, the rotary electric machine unit can be reduced in size.

DESCRIPTION OF EMBODIMENTS

An embodiment of a rotary electric machine unit according to the present invention will be described below with reference to the accompanying drawings.

Figure 1:
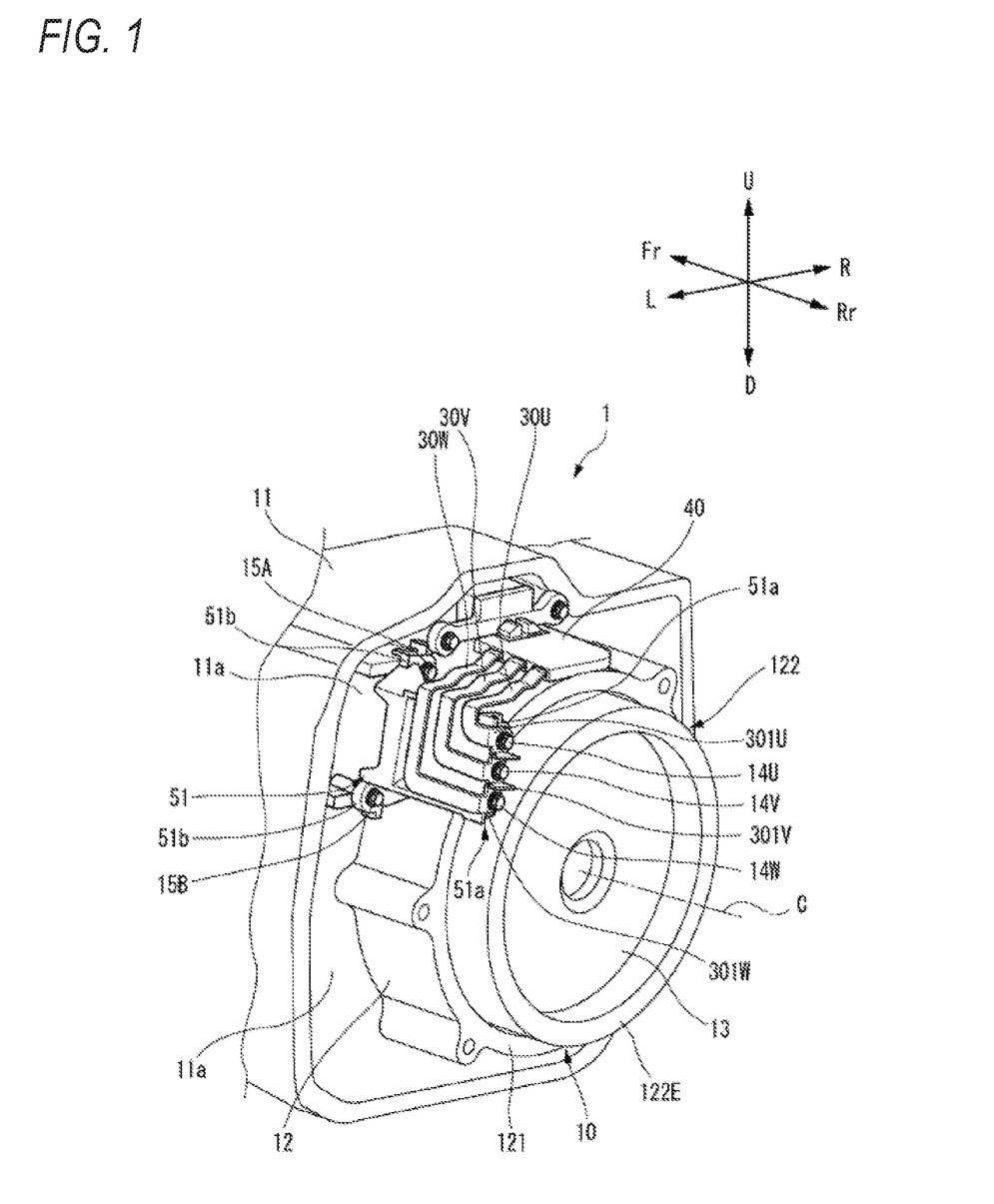
FIG. 1 is a perspective view showing an overall configuration of a rotary electric machine unit according to an embodiment of the present invention.
Figure 2:
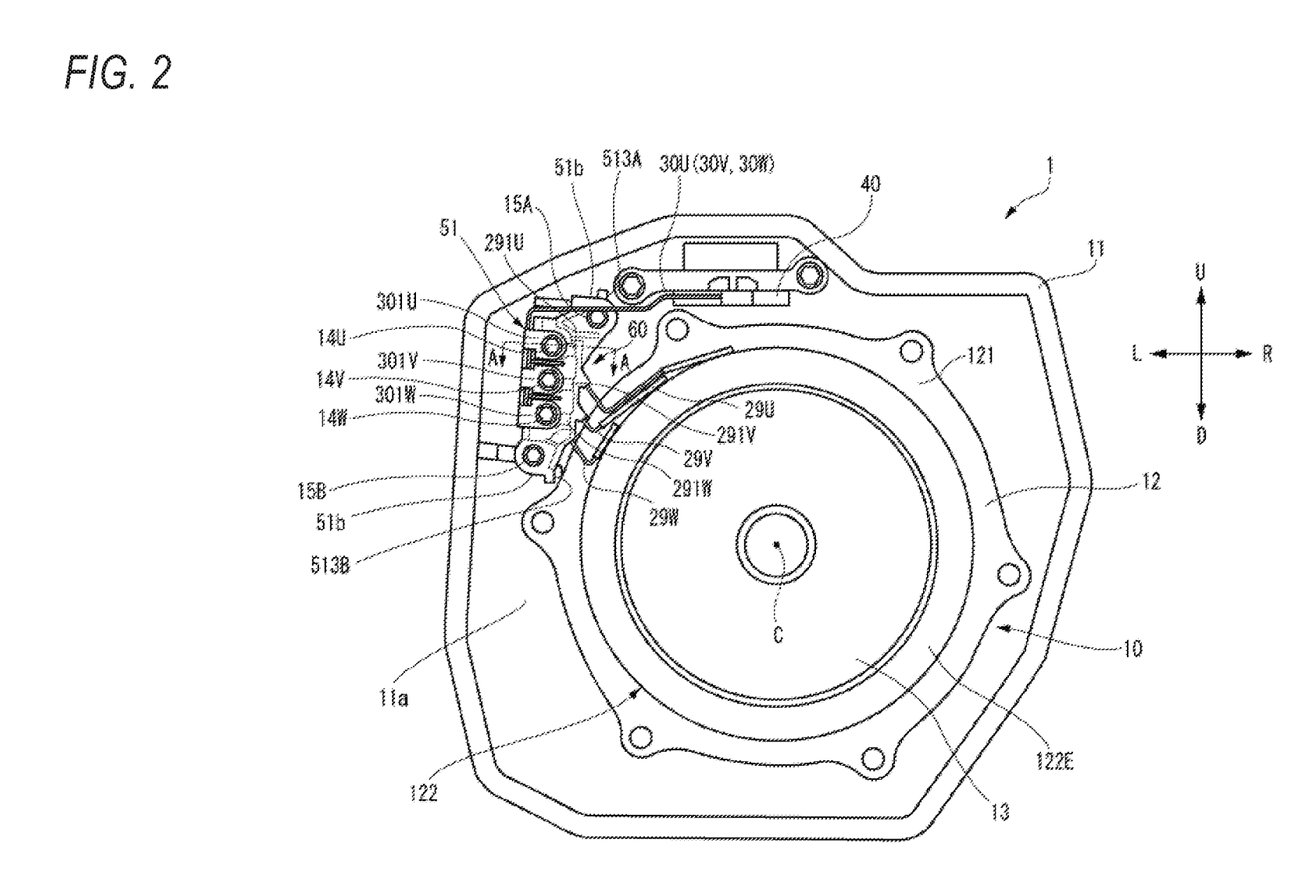
FIG. 2 is a view of the rotary electric machine unit of FIG. 1 as viewed from an axial direction.

First, an overall configuration of a rotary electric machine unit according to an embodiment of the present invention will be described with reference to FIGS. 1 and 2. A rotary electric machine unit 1 shown in FIG. 1 is a traveling motor unit mounted on a vehicle such as a hybrid automobile or an electric vehicle. However, the rotary electric machine unit according to the present invention is not limited to the traveling motor unit, but can also be applied to a motor unit for power generation, a motor unit for other applications, or a rotary electric machine unit other than for the vehicle.

In this specification, in order to simplify the description, front, rear, left, right, upper and lower directions of the rotary electric machine unit 1 are defined as shown in the drawings, and a front direction thereof is indicated by Fr, a rear direction thereof is indicated by Rr, a right direction thereof is indicated by R, a left direction thereof is indicated by L, an upper direction is indicated by U, and a lower direction is indicated by D, respectively. The directions shown in the drawing are independent of directions of the vehicle or the like on which the rotary electric machine unit 1 is mounted. In the following description, an axial direction refers to a direction along a rotation axis C of the rotary electric machine unit 1. In addition, a circumferential direction refers to, in a state in which the rotation axis C is visible as a point, a direction along a circumference of a circle drawn around the point. On the other hand, a radial direction refers to a direction from the point toward a circle or a direction from the circle to the point.

As shown in FIG. 1, the rotary electric machine unit 1 includes a motor 10 as a rotary electric machine and a case 11 that accommodates the motor 10. The motor 10 includes a stator 12 and a rotor 13. The rotor 13 has an annular shape and is externally fitted to a shaft (not shown). A case cover (not shown) that seals an opening portion of the case 11 is attached to the case 11.

The stator 12 includes a stator core 121 and a coil 122 attached to the stator core 121.

The stator core 121 is formed in a cylindrical shape surrounding the rotor 13 from the outside in the radial direction, and is fixed to a fastening surface 11a of the case 11 by a fastening member such as a bolt.

The coil 122 is a three-phase coil formed of a U-phase, a V-phase, and a W-phase. The coil 122 may be a segment coil or a continuous winding. The coil 122 includes coil ends 122E protruding from end surfaces of the stator core 121 to both sides in the axial direction. Incidentally, in the drawings, in the present embodiment, since only the coil end 122E on a side opposite to the fastening surface 11a of the case 11 is targeted, in the drawings, the coil end 122E on the fastening surface 11a side of the case 11 is omitted.

Figure 3:
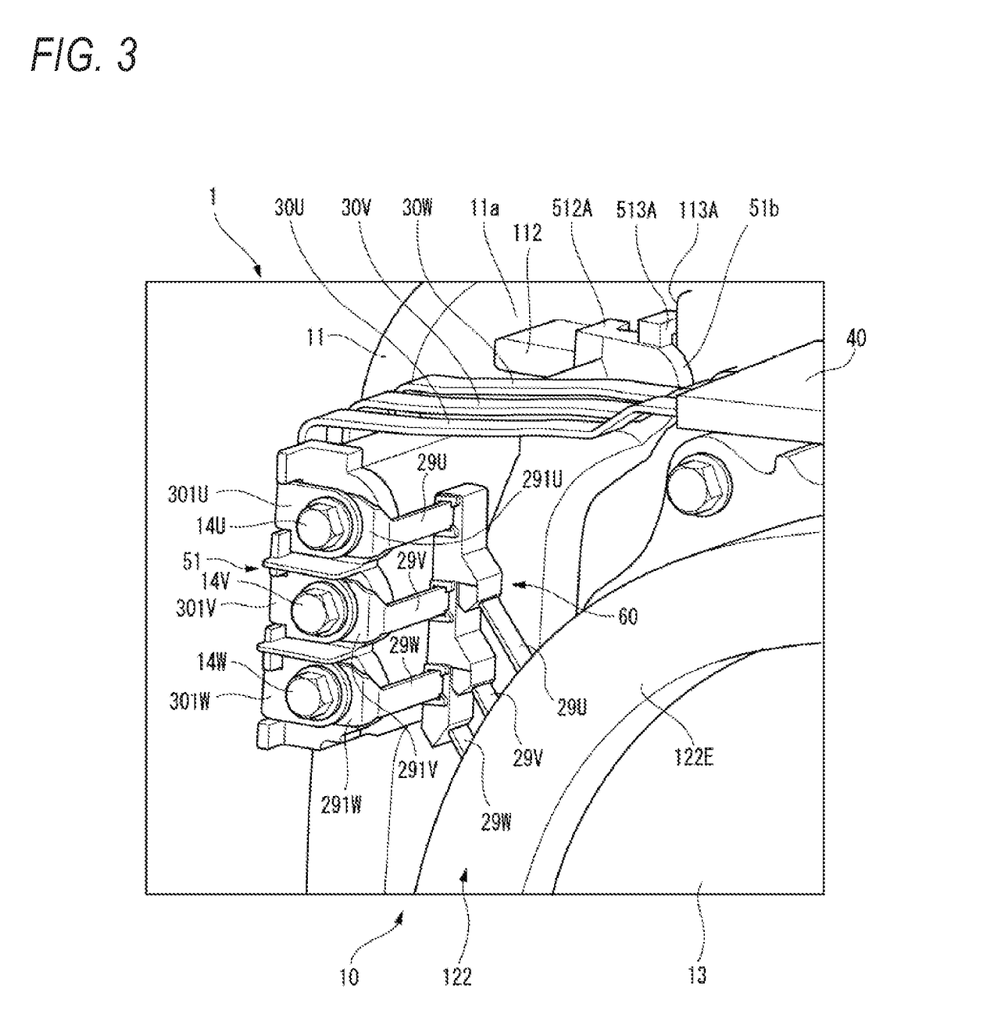
FIG. 3 is a perspective view of a periphery of a terminal block of the rotary electric machine unit of FIG. 1.

Referring also to FIG. 3, in addition to the motor 10, a conductive member holder 60 that collectively holds first bus bars 29U, 29V and 29W and a terminal block 51 for electrically connecting the first bus bars 29U, 29V and 29W and second bus bars 30U, 30V and 30W are provided inside the case 11.

The conductive member holder 60 collectively holds the three first bus bars 29U, 29V and 29W as a conductive member connected to the coil end 122E of the coil 122, and is disposed outside the coil end 122E in the radial direction.

One end of each of the second bus bars 30U, 30V and 30W is connected to a connector portion (not shown) connected to a power conversion device (not shown). The second bus bars 30U, 30V and 30W are three-dimensional bus bars that are bent in a front-rear direction, an upper-lower direction, and a left-right direction, respectively. A part of the second bus bars 30U, 30V and 30W is covered with a cover member 40.

The terminal block 51 is fixed to the fastening surface 11a of the case 11, and electrically connects terminal portions 301U, 301V and 301W of the three second bus bars 30U, 30V and 30W with terminal portions 291U, 291V and 291W of the first bus bars 29U, 29V and 29W, respectively.

Figure 4:
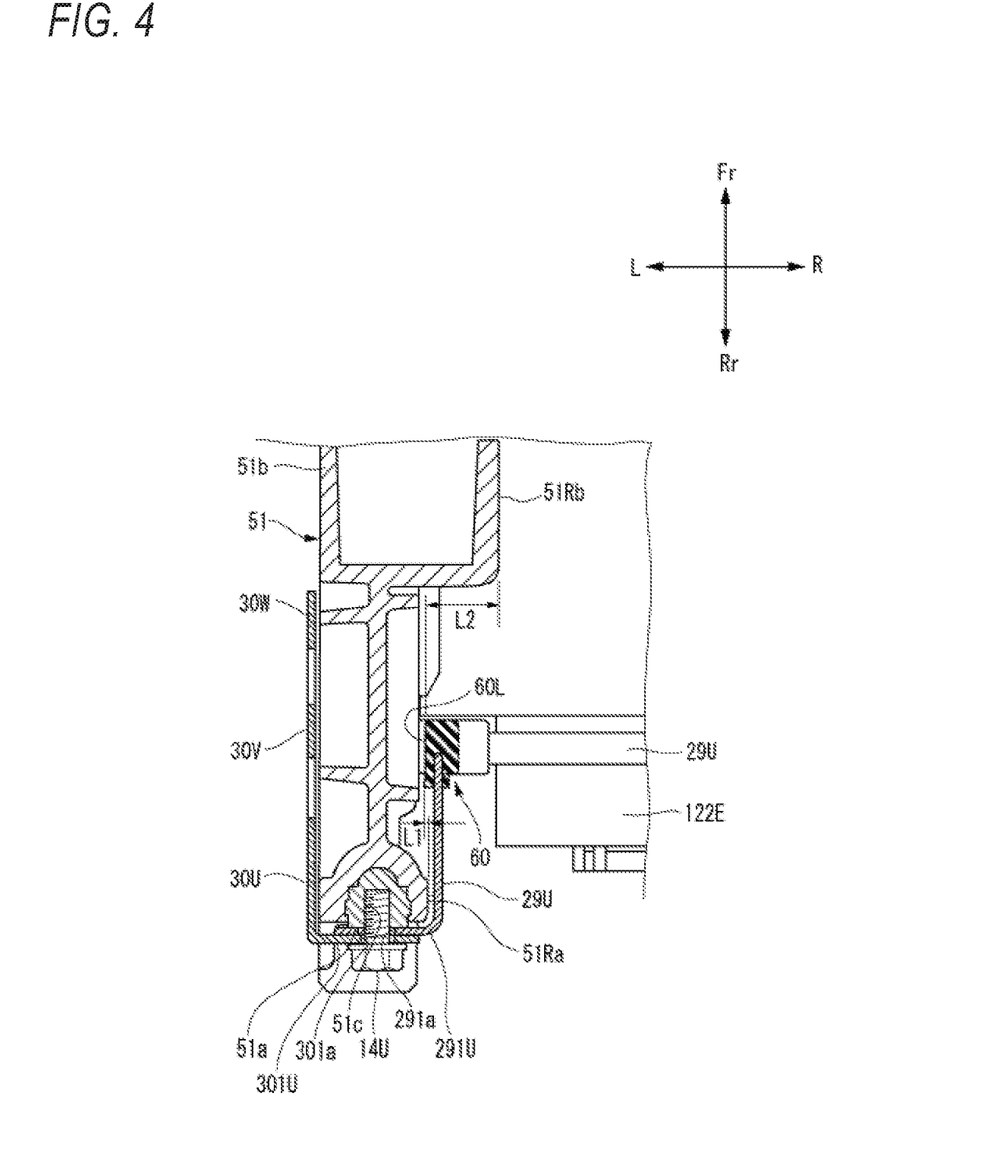
FIG. 4 is a sectional view taken along a line A-A of FIG. 2.
Figure 5:
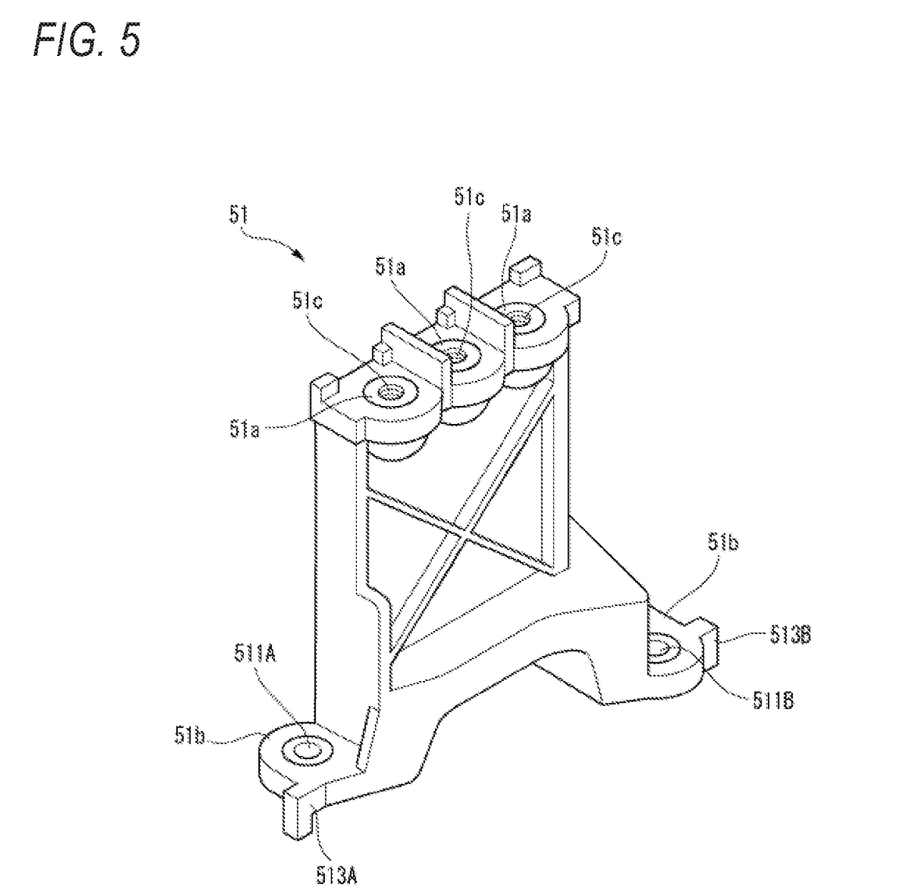
FIG. 5 is a perspective view of the terminal block of the rotary electric machine unit of FIG. 1.

As shown in FIGS. 4 and 5, the terminal block 51 has pedestal surfaces 51a on a side opposite to the fastening surface 11a of the case 11. The pedestal surfaces 51a are provided with three bolt holes 51c (FIG. 4) to which bolts 14U, 14V and 14W as a fixing member are attached. The terminal portions 301U, 301V and 301W of the second bus bars 30U, 30V and 30W and the terminal portions 291U, 291V and 291W of the first bus bars 29U, 29V and 29W are provided with hole portions 301a, 291a (FIG. 4) into which the bolts 14U, 14V and 14W are inserted, respectively. Both of the terminal portions 301U, 301V and 301W and the terminal portions 291U, 291V and 291W are disposed so as to overlap each other on the pedestal surfaces 51a of the terminal block 51, and are fixed to the pedestal surfaces 51a by the bolts 14U, 14V and 14W, respectively.

As described above, since the pedestal surfaces 51a of the terminal block 51 on which the terminal portions 30W, 301V and 301W of the second bus bars 30U, 30V and 30W and the terminal portions 291U, 291V and 291W of the first bus bars 29U, 29V and 29W are disposed are positioned on the side opposite to the fastening surface 11a of the case 11, fastening work of the bolts 14U, 14V and 14W can be easily performed.

The terminal block 51 is disposed outside the conductive member holder 60 in the radial direction. Since the conductive member holder 60 is disposed outside the coil end 122E of the coil 122 in the radial direction, the conductive member holder 60 can be prevented from protruding in the axial direction. In addition, since the terminal block 51 is disposed outside the conductive member holder 60 in the radial direction, the terminal block 51 can be prevented from protruding in the axial direction, so that a length of the motor 10 in the axial direction (directions of arrows Fr, Rr) can be shortened.

The terminal block 51 is disposed outside the conductive member holder 60 in the radial direction, and at least a part of the terminal block 51 overlaps the conductive member holder 60 in the radial direction. More specifically, referring to FIG. 4, a left end portion 60L of the conductive member holder 60 is positioned on a left side of a right end surface 51Ra of the pedestal surface 51a of the terminal block 51, and is positioned on a left side of a right end surface 51Rb of a fixing portion 51b. In other words, there is an overlap region indicated by a reference symbol L1 in FIG. 4 between the left end portion 60L of the conductive member holder 60 and the right end surface 51Ra of the pedestal surface 51a of the tenninal block 51, there is an overlap region indicated by a reference symbol L2 in FIG. 4 between the left end portion 601L of the conductive member holder 60 and the right end surface 51Rb of the fixing portion 51b of the terminal block 51, and a part of the conductive member holder 60 is disposed in a nested manner with respect to the terminal block 51.

Since at least a part of the terminal block 51 overlaps the conductive member holder 60 in the radial direction, a length of the motor 10 in the radial direction can also be shortened. Therefore, the rotary electric machine unit 1 can be reduced in size.

Figure 6:
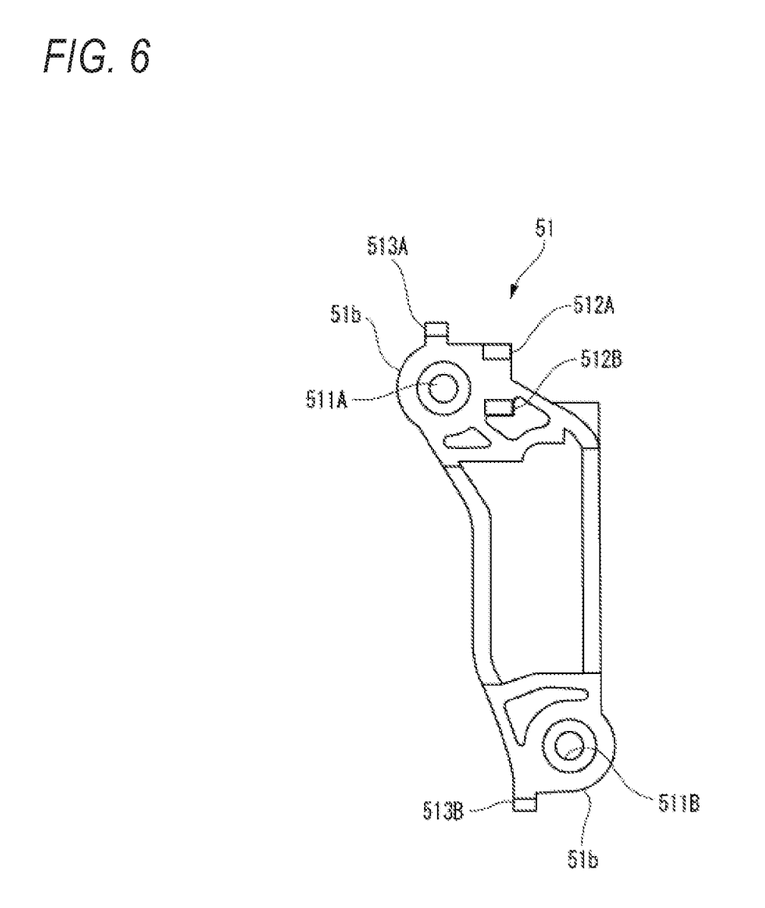
FIG. 6 is a view showing an attachment surface of the terminal block of FIG. 5.
Figure 7:
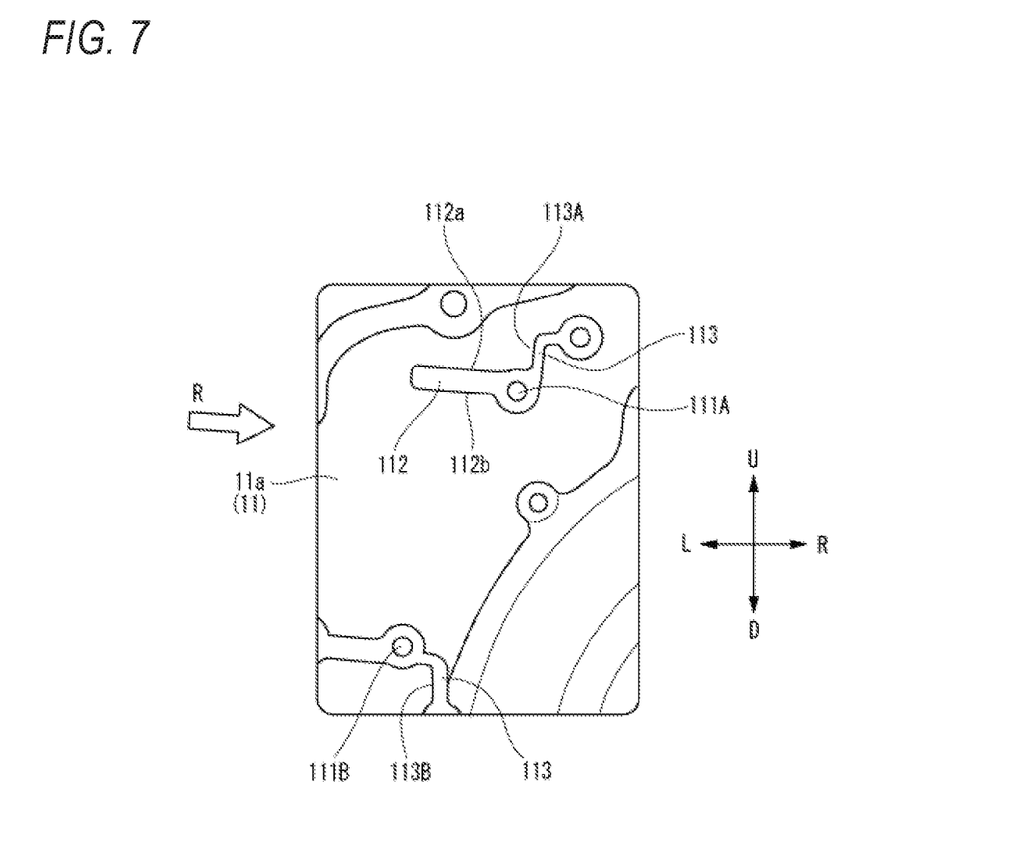
FIG. 7 is a view showing a fastening surface of a case of the rotary electric machine unit of FIG. 1.

As shown in FIGS. 5 and 6, the terminal block 51 includes the fixing portions 51b fixed to the fastening surface 11a of the case 11 on a side opposite to the pedestal surfaces 51a in the front-rear direction. The two fixing portions 51b are provided at upper and lower positions of the terminal block 51, and the fixing portions 51b are provided with bolt insertion holes 511A, 511B, respectively. On the other hand, as shown in FIG. 7, two bolt holes 111A, 111B for fixing the terminal block 51 are provided on the fastening surface 11a of the case 11. Referring also to FIGS. 1 and 2, the terminal block 51 is fixed to the fastening surface 11a of the case 11 by respectively inserting bolts 15A, 1513 into the bolt insertion holes 511A, 511B, and fastening them into the bolt holes 111A, 111B of the fastening surface 11a.

As shown in FIG. 7, a rib-like guide protrusion 112 extending in the left-right direction is provided on the fastening surface 11a of the case 11.

On the other hand, as shown in FIG. 6, one fixing portion 51b of the terminal block 51 is provided with a pair of upper and lower guide portions 512A, 512B that are guided by the guide protrusion 112 in sliding contact with two upper and lower surfaces 112a, 112b of the guide protrusion 112.

As described above, since a part of the terminal block 51 overlaps the conductive member holder 60 in the radial direction, the terminal block 51 cannot be assembled from the axial direction (the front-rear direction of the present embodiment) with respect to the case 11 provided with the motor 10 and the conductive member holder 60. Even if the terminal block 51 is assembled from the axial direction, the fixing portion 51b of the terminal block 51 interferes with the conductive member holder 60. Therefore, the assembling of the terminal block 51 needs to be assembled such that the fixing portion 51b of the terminal block 51 is slid between the fastening surface 11a of the case 11 and the conductive member holder 60 in a direction indicated by an arrow R in FIG. 7 from a position (initial position) slightly shifted outward in the radial direction with respect to the case 11 provided with the motor 10 and the conductive member holder 60.

At this time, the terminal block 51 is moved inward with the pair of guide portions 512A, 512B provided on the one fixing portion 51b of the terminal block 51 being moved along the guide protrusion 112 provided on the fastening surface 11a, so that the terminal block 51 can be moved to a mounting position accurately and easily.

As shown in FIG. 7, the fastening surface 11a of the case 11 are provided with abutting surfaces 113A, 113B at two upper and lower positions. The abutting surfaces 113A, 113E are formed by side surfaces of rib-like protrusions 113 provided on the fastening surface 11a. n the present embodiment, the rib-like protrusion 113 having the upper abutting surface 113A extends from the guide protrusion 112.

As shown in FIGS. 5 and 6, the two fixing portions 51b of the terminal block 51 are provided with abutting portions 513A, 513B that abut against the abutting surfaces 113A, 113B at the mounting position when the terminal block 51 is moved from the initial position to the mounting position.

According to this configuration, when the terminal block 51 is moved along the guide protrusion 112, the abutting portions 513A, 513B of the terminal block 51 abut against the abutting surfaces 113A, 113B of the case 11, so that the terminal block 51 can be positioned at the correct mounting position.

The above-described embodiment can be appropriately modified, improved, or the like.

For example, although the guide protrusion 112 is provided at one position of the fastening surface 11a of the case 11 in the present embodiment, the guide protrusion 112 may be provided at a plurality of positions of the fastening surface 11a, and the terminal block 51 may be provided with a plurality of pairs of guide portions 512A, 512B that are guided by the respective guide protrusions 112.

In addition, the guide portions 512A, 512B guided by the guide protrusion 112 are not necessarily a pair, and may be only one of them.

At least the following matters are described in the present specification. Components corresponding to the above-described embodiments are shown in parentheses, but the present invention is not limited thereto.

(1) A rotary electric machine unit (rotary electric machine unit 1) including:
a rotary electric machine (motor 10); and
a case (case 11) that accommodates the rotary electric machine,
wherein the rotary electric machine includes
a stator core (stator core 121),
a multi-phase coil (coil 122) that is attached to the stator core,
a conductive member holder (conductive member holder 60) that collectively holds a conductive member (first bus bars 29U, 29V and 29W) connected to a coil end (coil end 122E) of the multi-phase coil and is disposed outside the coil end in a radial direction, and
a terminal block (terminal block 51) that is fixed to a fastening surface (fastening surface 11a) of the case and electrically connects a terminal portion (terminal portions 301U, 301V and 301W) of a power distribution member (second bus bars 30U, 30V and 30W) with a terminal portion (terminal portions 291U, 291V and 291W) of the conductive member, and wherein the terminal block is disposed outside the conductive member holder in the radial direction, and at least a part of the terminal block overlaps the conductive member holder in the radial direction.

According to (1), since the conductive member holder is disposed outside the coil end in the radial direction, the conductive member holder can be prevented from protruding in the axial direction. Since the terminal block that electrically connects the terminal portion of the power distribution member with the terminal portion of the conductive member is disposed outside the conductive member holder in the radial direction, the terminal block can be prevented from protruding in the axial direction, so that a length of the rotary electric machine in the axial direction can be shortened. In addition, since at least a part of the terminal block overlaps the conductive member holder in the radial direction, a length of the rotary electric machine in the radial direction can also be shortened. Therefore, the rotary electric machine unit can be reduced in size.

(2) The rotary electric machine unit according to (1),
wherein the terminal portion of the power distribution member and the terminal portion of the conductive member are disposed on a pedestal surface (pedestal surface 51a) of the terminal block on a side opposite to the fastening surface, and are fixed by a fixing member (bolts 14U, 14V and 14W).

According to (2), since the pedestal surface of the terminal block on which the terminal portion of the power distribution member and the terminal portion of the conductive member are disposed is positioned on the side opposite to the fastening surface of the case, fastening work of the fixing member can be easily performed.

(3) The rotary electric machine unit according to (2),
wherein the terminal block includes a fixing portion (fixing portion 51b) fixed to the fastening surface, and
wherein the fixing portion d the pedestal surface overlap the conductive member holder in the radial direction.

According to (3), since the fixing portion and the pedestal surface of the terminal block overlap the conductive member holder in the radial direction, that is, the conductive member holder is nested in the terminal block, the conductive member holder can be protected by the terminal block.

(4) The rotary electric machine unit according to (3),
wherein the fastening surface of the case is provided with a guide protrusion (guide protrusion 112), and
wherein the fixing portion of the terminal block is provided with a guide portion guided by the guide protrusion.

According to (4), since the conductive member holder is nested in the terminal block, the terminal block cannot be attached along the axial direction of the rotary electric machine in a state in which the rotary electric machine provided with the conductive member holder is disposed. However, the terminal block can be easily moved to a mounting position by moving the terminal block along the guide protrusion from a position slightly shifted from the conductive member holder.

(5) The rotary electric machine unit according to (4),
wherein the fastening surface of the case is provided with an abutting surface (abutting surfaces 113A, 113B), and
wherein the fixing portion of the terminal block is provided with an abutting portion (abutting portions 513A, 513B) that abuts against the abutting surface at the mounting position when the terminal block is moved from an initial position to a mounting position.

According to (5), when the terminal block is moved along the guide protrusion, the abutting portion of the terminal block abuts against the abutting surface of the case, so that the terminal block can be positioned at the correct mounting position.

The invention claimed is:
1. A rotary electric machine unit comprising:
a rotary electric machine; and a case that accommodates the rotary electric machine, wherein:

the rotary electric machine includes:
- a stator core;
- a multi-phase coil that is attached to the stator core;
- a conductive member holder that collectively holds a conductive member connected to a coil end of the multi-phase coil and is disposed outside the coil end in a radial direction; and
- a terminal block that is fixed to a fastening surface of the case and electrically connects a terminal portion of a power distribution member with a terminal portion of the conductive member;

the terminal portion of the power distribution member and the terminal portion of the conductive member are disposed on a pedestal surface of the terminal block on a side opposite to the fastening surface, and are fixed by a fixing member;

the terminal block is disposed outside the conductive member holder in the radial direction, and includes a fixing portion fixed to the fastening surface;

the fixing portion and the pedestal surface overlap the conductive member holder in the radial direction when viewed from an axial direction; and the conductive member holder is disposed between the fixing portion and the pedestal surface in the axial direction.

2. The rotary electric machine unit according to claim 1, wherein:
- the fastening surface of the case is provided with a guide protrusion; and
- the fixing portion of the terminal block is provided with a guide portion guided by the guide protrusion.

3. The rotary electric machine unit according to claim 2, wherein:
- the fastening surface of the case is provided with an abutting surface; and
- the fixing portion of the terminal block is provided with an abutting portion that abuts against the abutting surface at a mounting position when the terminal block is moved from an initial position to the mounting position.

* * * * *